(12) United States Patent
Kim et al.

(10) Patent No.: US 9,178,190 B2
(45) Date of Patent: Nov. 3, 2015

(54) CAP ASSEMBLY HAVING IMPROVED MANUFACTURING PROCESSABILITY AND CYLINDRICAL BATTERY COMPRISING SAME

(71) Applicant: LG Chem, Ltd., Seoul (KR)

(72) Inventors: Sung Jong Kim, Daejeon (KR); Je Jun Lee, Daejeon (KR); Cha-Hun Ku, Daejeon (KR); Byungkyu Jung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/353,535

(22) PCT Filed: Dec. 13, 2012

(86) PCT No.: PCT/KR2012/010817
§ 371 (c)(1),
(2) Date: Apr. 23, 2014

(87) PCT Pub. No.: WO2013/100446
PCT Pub. Date: Jul. 4, 2013

(65) Prior Publication Data
US 2014/0302358 A1 Oct. 9, 2014

(30) Foreign Application Priority Data
Dec. 26, 2011 (KR) .................... 10-2011-0142198

(51) Int. Cl.
| | | |
|---|---|---|
| *H01M 2/04* | (2006.01) | |
| *H01M 2/08* | (2006.01) | |
| *H01M 2/12* | (2006.01) | |
| *H01M 2/34* | (2006.01) | |
| *H01M 10/04* | (2006.01) | |
| *H01M 10/0587* | (2010.01) | |
| *H01M 2/22* | (2006.01) | |
| *H01M 10/052* | (2010.01) | |

(52) U.S. Cl.
CPC .......... *H01M 2/0404* (2013.01); *H01M 2/0434* (2013.01); *H01M 2/08* (2013.01); *H01M 2/12* (2013.01); *H01M 2/22* (2013.01);
(Continued)

(58) Field of Classification Search
None
See application file for complete search history.

(56) References Cited

U.S. PATENT DOCUMENTS

| | | | |
|---|---|---|---|
| 2005/0147878 A1* | 7/2005 | Miyahisa et al. | ............. 429/174 |
| 2007/0015046 A1 | 1/2007 | Kim et al. | |

(Continued)

FOREIGN PATENT DOCUMENTS

| | | |
|---|---|---|
| EP | 1035611 A2 | 9/2000 |
| EP | 2472634 A1 | 7/2012 |

(Continued)

OTHER PUBLICATIONS

International Search Report for PCT/KR2012/010817 mailed Feb. 22, 2013.

*Primary Examiner* — Jonathan Crepeau
(74) *Attorney, Agent, or Firm* — Lerner, David, Littenberg, Krumholz & Mentlik, LLP

(57) ABSTRACT

Disclosed herein is a cap assembly loaded on an open upper end of a cylindrical container of a battery configured to have a structure in which an electrode assembly (jelly roll) of a cathode/separator/anode structure is mounted in the cylindrical container, the cap assembly including a safety vent connected to a current interruptive device (CID) for safety, a protruding top cap connected to the safety vent along an outer circumference thereof, and a gasket mounted at an outer circumference of the top cap, wherein a cathode tab is attached to a cathode active material-uncoated portion of the cathode by welding and the gasket is provided with at least one groove depressed upward from an outer circumference of a lower end of the gasket for easy welding between the CID and the cathode tab at the time of manufacturing the battery.

14 Claims, 3 Drawing Sheets

(52) U.S. Cl.
CPC ............ *H01M 2/345* (2013.01); *H01M 2/348* (2013.01); *H01M 10/0422* (2013.01); *H01M 10/0587* (2013.01); *H01M 10/052* (2013.01)

(56) References Cited

U.S. PATENT DOCUMENTS

| | | | |
|---|---|---|---|
| 2007/0020517 A1* | 1/2007 | Chun | 429/174 |
| 2011/0008654 A1 | 1/2011 | Kim et al. | |
| 2011/0129708 A1 | 6/2011 | Doo | |
| 2012/0114979 A1 | 5/2012 | Kim et al. | |

FOREIGN PATENT DOCUMENTS

| | | |
|---|---|---|
| JP | 2000260409 A | 9/2000 |
| JP | 2004119067 A | 4/2004 |
| JP | 3652000 B2 | 5/2005 |
| JP | 2007027103 A | 2/2007 |
| KR | 20080034221 A | 4/2008 |
| KR | 20080050642 A | 6/2008 |
| KR | 20100041472 A | 4/2010 |
| KR | 20110017835 A | 2/2011 |

* cited by examiner

200

210

200a

210

220

CAP ASSEMBLY HAVING IMPROVED MANUFACTURING PROCESSABILITY AND CYLINDRICAL BATTERY COMPRISING SAME

CROSS-REFERENCE TO RELATED APPLICATIONS

The present application is a national phase entry under 35 U.S.C. §371 of International Application No. PCT/KR2012/010817 filed Dec. 13, 2012, which claims priority to Korean Patent Application No. 10-2011-0142198, filed Dec. 26, 2011, the disclosures of which are incorporated herein by reference.

TECHNICAL FIELD

The present invention relates to a cap assembly with improved productivity and a cylindrical battery cell including the same and, more particularly, to a cap assembly loaded on an open upper end of a cylindrical container of a battery configured to have a structure in which an electrode assembly (jelly roll) of a cathode/separator/anode structure is mounted in the cylindrical container, the cap assembly including a safety vent connected to a current interruptive device (CID) for safety, a protruding top cap connected to the safety vent along an outer circumference thereof, and a gasket mounted at an outer circumference of the top cap, wherein a cathode tab is attached to a cathode active material-uncoated portion of the cathode by welding and the gasket is provided with at least one groove depressed upward from an outer circumference of a lower end of the gasket for easy welding between the CID and the cathode tab at the time of manufacturing the battery.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and life span characteristics, which has been widely used as an energy source for various electronic products as well as varieties of mobile devices.

Based on the shape of a battery case, a secondary battery may be classified as a cylindrical battery having an electrode assembly mounted in a cylindrical metal container, a prismatic battery having an electrode assembly mounted in a prismatic metal container, or a pouch-shaped battery having an electrode assembly mounted in a pouch-shaped case formed of an aluminum laminate sheet. The cylindrical battery has advantages in that the cylindrical battery has relatively large capacity and is structurally stable.

The electrode assembly mounted in the battery case serves as a power generating element, having a cathode/separator/anode stack structure, which can be charged and discharged. The electrode assembly may be classified as a jelly roll type electrode assembly configured to have a structure in which a long sheet type cathode and a long sheet type anode, to which active materials are applied, are wound in a state in which a separator is disposed between the cathode and the anode, a stacked type electrode assembly configured to have a structure in which a plurality of cathodes having a predetermined size and a plurality of anodes having a predetermined size are sequentially stacked in a state in which separators are disposed respectively between the cathodes and the anodes, or a stacked/folded type electrode assembly, which is a combination of the a jelly roll type electrode assembly and the stacked type electrode assembly. The jelly roll type electrode assembly has advantages in that the jelly roll type electrode assembly is easy to manufacture and has high energy density per weight.

In connection with the above, the structure of a conventional cylindrical secondary battery is shown in FIG. 1.

Referring to FIG. 1, the cylindrical secondary battery 10 generally includes a cylindrical container 20, a jelly roll type electrode assembly 30 mounted in the container 20, a cap assembly 40 coupled to the upper end of the container 20, and a crimp region 50 at which the cap assembly 40 is mounted.

The electrode assembly 30 is configured to have a structure in which a cathode 31 and an anode 32 are wound into a jelly-roll shape in a state in which a separator 33 is disposed between the cathode 31 and the anode 32. To the cathode 31 is attached a cathode tab 34, which is connected to the cap assembly 40. To the anode 32 is attached an anode tab (not shown), which is connected to the lower end of the container 20.

Meanwhile, a lithium secondary battery has a disadvantage in that the lithium secondary battery has low safety. For example, when the battery is overcharged to approximately 4.5 V or more, a cathode active material is decomposed, dendritic growth of lithium metal occurs at an anode, and an electrolyte is decomposed. At this time, heat is generated from the battery with the result that the above-mentioned decompositions and several sub decompositions rapidly progress and, eventually, the battery may catch fire and explode.

In order to solve the above-mentioned problems, therefore, a general cylindrical secondary battery includes a current interruptive device (CID) and a safety vent mounted in a space defined between an electrode assembly and a top cap to interrupt electric current and release internal pressure when the secondary battery malfunctions.

Specifically, the cap assembly 40 includes a top cap 41 constituting a cathode terminal, a positive temperature coefficient (PTC) element 42 for interrupting electric current through the great increase of battery resistance when the interior temperature of the battery increases, a safety vent 43 for interrupting electric current and/or exhaust gas when the interior pressure of the battery increases, an insulating member 44 for electrically isolating the safety vent 43 from a cap plate 45 excluding a specific portion, and the cap plate 45 connected to the cathode tab 34, which is attached to the cathode 31. The cap assembly 40 is configured to have a structure in which the top cap 41, the PTC element 42, the safety vent 43, the insulating member 44, and the cap plate 45 are sequentially stacked.

The crimp region 50 is formed at the upper end of the container 20 such that the cap assembly 40 can be mounted to the open upper end of the container 20. More specifically, the crimp region 50 is formed by beading the upper end of the container 20 such that a beaded part 21 is formed at the inside of the container 20, sequentially inserting the outer circumferences of the cap plate 45, the insulating member 44, the safety vent 43, and the top cap 41 into a gasket 60, and bending the upper end of the container 20. As a result, the crimp region 50 is formed in a shape to surround the gasket 60 positioned at the inside of the crimp region 50. The cap assembly 40 is mounted at the crimp region 50 by crimping and pressing.

Since welding between the cathode tab 34 and the cap plate 45 is performed at the inside lower end of the gasket 60, however, interference may be caused due to the structure of the outer circumference of the lower end of the gasket. As a result, contact between the cathode tab and the cap plate may be weakened.

In addition, when the battery falls or external impact is applied to the battery, the jelly roll may rotate in a specific direction or move upward and downward with the result that a short circuit may occur at a cathode tab contact region.

Therefore, there is a high necessity for technology to fundamentally solve the above problems.

DISCLOSURE

Technical Problem

Therefore, the present invention has been made to solve the above problems, and other technical problems that have yet to be resolved.

Specifically, it is an object of the present invention to provide a cap assembly that is capable of preventing interference at the time of welding a cathode tab of a battery while securing safety of the battery, thereby improving weldability of the cathode tab.

It is another object of the present invention to provide a secondary battery with improved productivity and safety which can be manufactured using the cap assembly.

Technical Solution

In accordance with one aspect of the present invention, the above and other objects can be accomplished by the provision of a cap assembly loaded on an open upper end of a cylindrical container of a battery configured to have a structure in which an electrode assembly (jelly roll) of a cathode/separator/anode structure is mounted in the cylindrical container, the cap assembly including a safety vent connected to a current interruptive device (CID) for safety, a protruding top cap connected to the safety vent along an outer circumference thereof, and a gasket mounted at an outer circumference of the top cap, wherein a cathode tab is attached to a cathode active material-uncoated portion of the cathode by welding and the gasket is provided with at least one groove depressed upward from an outer circumference of a lower end of the gasket for easy welding between the CID and the cathode tab at the time of manufacturing the battery.

As described above, the cap assembly according to the present invention has the groove having the specific structure. Consequently, it is possible to minimize interference due to the outer circumference of the lower end of the gasket during welding between the CID and the cathode tab, thereby improving weldability.

The connection between the CID and the cathode tab may be achieved in various manners. In a preferred example, the cathode tab may be connected to the bottom of the CID by welding.

It is necessary for the cathode tab to have predetermined flexibility such that the connection between the CID and the cathode tab can be stably maintained even when external impact, such as vibration, is applied to the battery. Such flexibility may be achieved as the cathode tab is welded in a state in which at least a portion of the cathode tab is bent.

In consideration of this respect, the length of the groove is not greatly restricted so long as the groove does not cause interference when the cathode tab is welded. For example, the groove may have a length of 0.5 mm to 1.5 mm, preferably 0.7 mm to 1.2 mm.

In addition, the groove may have a width of 1 mm in consideration of welding of the cathode tab.

Meanwhile, the at least one groove may include two or more grooves symmetric with the respect to a central axis of the gasket. When the cathode tab is welded, therefore, a sensor or the like may be easily inserted through the groove, thereby improving welding efficiency.

In another example, the gasket may further include an extension extending downward from the outer circumference of the lower end of the gasket for preventing movement of the jelly roll.

That is, since the extension as well as the groove is formed at the outer circumference of the lower end of the gasket, the upper end of the jelly roll is pressed and, therefore, it is possible to prevent rotation and upward and downward movement of the jelly roll during vibration.

In the above structure, the extension may have a length of 3 mm or less. If the length of the extension is too large, it is not easy to mount the cap assembly, which is not preferable. On the other hand, if the length of the extension is too small, it is difficult for the extension to function, which is not preferable. Preferably, the extension may have a length of 2 mm or less.

In another aspect, the downwardly extending extension may be understood as a concept corresponding to the upwardly depressed groove. That is, a portion between the upwardly depressed grooves may form a kind of downwardly extending extension. Preferably, however, the extension and the groove are configured to have a more greatly downwardly extending and/or upwardly depressed structure than a conventional gasket in consideration of the dimensions of the conventional gasket.

The material for the gasket is not particularly restricted so long as the gasket is formed of an insulative material. For example, the gasket may be formed of an electrically insulative polymer resin or an electrically insulative polymer compound. Specifically, the gasket may be formed of at least one selected from a group consisting of polypropylene (PP), polyethylene (PE), polyethylene terephthalate (PET), polytetrafluoroethylene (PTFE), thermo-plastic polyester elastomer (TPEE), and rubber.

In accordance with another aspect of the present invention, there is provided a cylindrical battery including the cap assembly with the above-stated construction.

The battery may be a secondary battery that can be continuously charged and discharged. For example, the battery may be a lithium secondary battery.

The basic structure of the cylindrical battery has been previously described with reference to FIG. 1 and a method of manufacturing the cylindrical battery is well known in the art to which the present invention pertains. For this reason, a detailed description of the cylindrical battery will be omitted. Of course, however, the cylindrical battery according to the present invention may be applied to any change or modification of the cylindrical battery shown in FIG. 1.

BRIEF DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiment.

Figure 1:
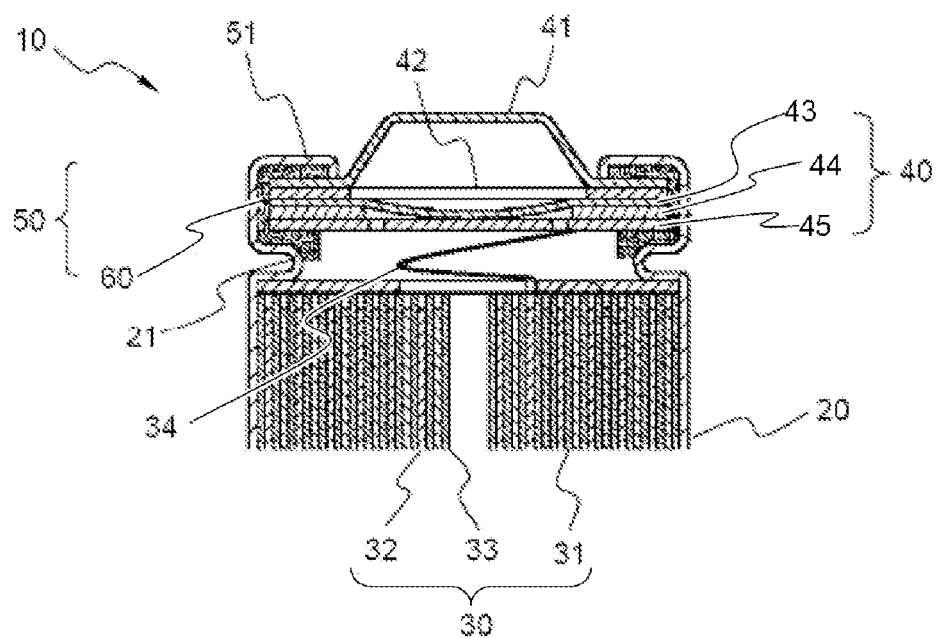
FIG. 1 is a vertical sectional view showing the structure of a conventional cylindrical secondary battery.
Figure 2:
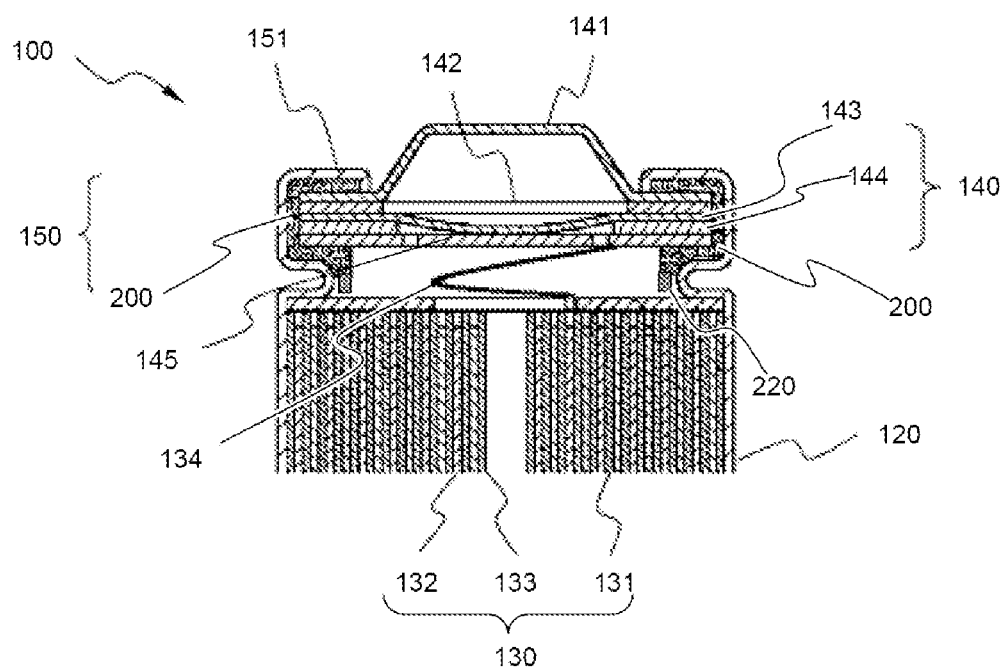
FIG. 2 is a vertical sectional view showing the structure of a cylindrical secondary battery according to the present invention.
Figure 3:
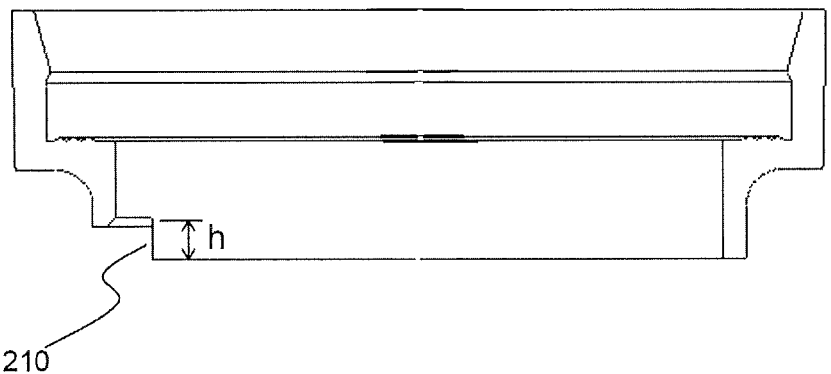
FIG. 3 is a sectional view showing a gasket of FIG. 2 as an example.

FIG. 2 is a vertical sectional view showing the structure of a cylindrical secondary battery according to an embodiment of the present invention and FIG. 3 is a sectional view typically showing a gasket of FIG. 2.

Referring to these drawings, a battery 100 is configured to have a structure in which a jelly roll 130 of a cathode 131/separator 133/anode 132 structure is mounted in a cylindrical container 120 and a cap assembly 140 is loaded on an open upper end of the container 120. The cap assembly 140 includes a safety vent 143 connected to a current interruptive device (CID) 145, a protruding top cap 141 connected to the safety vent 143 along the outer circumference of the safety vent 143, and a gasket 200 mounted at the outer circumference of the top cap 141.

A cathode tab 134 is attached to a cathode active material-uncoated portion (not shown) of the cathode 131 by welding. The cathode tab 134 is welded to the bottom of the CID 145 in a state in which the cathode tab 134 is bent.

For easy welding between the CID 145 and the cathode tab 134, the gasket 200, which is formed of polypropylene (PP), is provided with a groove 210, having a length of about 0.8 mm, depressed upward from the outer circumference of the lower end thereof.

Figure 4:
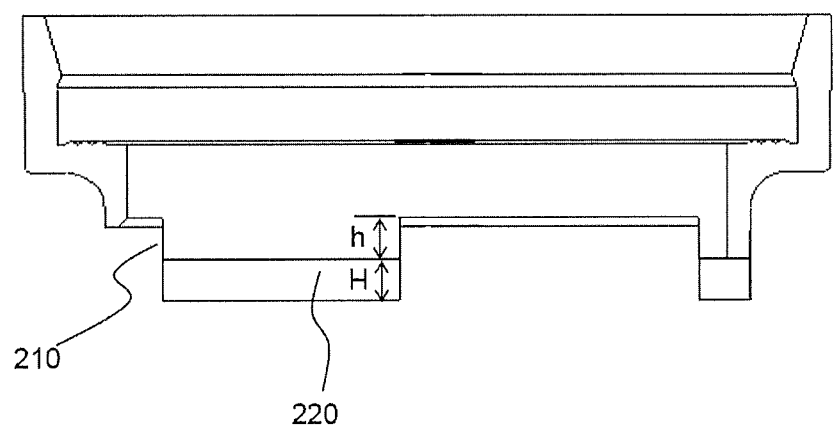
FIG. 4 is a sectional view showing a gasket of FIG. 2 as another example.

FIG. 4 is a sectional view typically showing a gasket of FIG. 2 as another embodiment of the present invention.

Referring to FIG. 4 together with FIG. 3, the gasket of FIG. 4 is identical to the gasket of FIG. 3 except that the gasket further includes an extension 220, having a length of about 1.5 mm, extending downward from the outer circumference of the lower end of the gasket 200 for preventing movement of the jelly roll and, therefore, a detailed description thereof will be omitted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a cap assembly according to the present invention has a groove depressed upward from the outer circumference of the lower end of a gasket, thereby minimizing interference due to the outer circumference of the lower end of the gasket during welding between a current interruptive device (CID) and a cathode tab. In a preferred example, an extension extending downward from the outer circumference of the lower end of the gasket is further provided to prevent movement of a jelly roll, thereby improving safety of a battery cell.

The invention claimed is:

1. A method of manufacturing a battery, comprising:
   loading a cap assembly on an open upper end of a container having an electrode assembly mounted therein, the cap assembly including:
   a safety vent connected to a current interruptive device (CID) for safety;
   a protruding top cap connected to the safety vent along an outer circumference thereof; and
   a gasket mounted at an outer circumference of the top cap, the gasket having at least one groove depressed upward from an outer circumference of a lower end of the gasket; and
   through the groove in the gasket, welding a cathode tab to the CID, the cathode tab being attached to a cathode active material-uncoated portion of a cathode of the electrode assembly.

2. The method of claim 1, wherein the step of welding the cathode tab to the CID comprises welding the cathode tab to a bottom of the CID.

3. The method of claim 2, wherein the step of welding the cathode tab to the CID occurs when at least a portion of the cathode tab is in a bent state.

4. The method of claim 3, wherein the at least one groove has a length of 0.5 mm to 1.5 mm.

5. The method of claim 4, wherein the at least one groove has a width of 1 mm.

6. The method of claim 1, wherein the at least one groove comprises two or more grooves symmetric with respect to a central axis of the gasket.

7. The method of claim 6, further comprising inserting a sensor through one of the two or more grooves during the step of welding the cathode tab to the CID.

8. The method of claim 1, wherein the gasket further comprises an extension extending downward from the outer circumference of the lower end of the gasket for preventing movement of the electrode assembly.

9. The method of claim 8, wherein the extension has a length of 3 mm or less.

10. The method of claim 1, wherein the gasket is formed of at least one material selected from a group consisting of polypropylene (PP), polyethylene (PE), polyethylene terephthalate (PET), polytetrafluoroethylene (PTFE), thermo-plastic polyester elastomer (TPEE), and rubber.

11. The method of claim 1, wherein the battery is a lithium secondary battery.

12. The method of claim 1, wherein the container is cylindrical.

13. The method of claim 12, wherein the electrode assembly includes the cathode, an anode, and a separator therebetween, all wound into a jelly-roll shape.

14. The method of claim 1, wherein the cathode tab is attached to the cathode active material-uncoated portion of the cathode by welding.

* * * * *